(12) United States Patent
Laskin

(10) Patent No.: US 8,023,206 B2
(45) Date of Patent: Sep. 20, 2011

(54) ACHROMATIC OPTICAL SYSTEM FOR BEAM SHAPING

(75) Inventor: Alexander Laskin, Berlin (DE)

(73) Assignee: Molecular Technology GmbH, Berlin (DE)

( * ) Notice: Subject to any disclaimer, the term of this patent is extended or adjusted under 35 U.S.C. 154(b) by 18 days.

(21) Appl. No.: 12/508,957

(22) Filed: Jul. 24, 2009

(65) Prior Publication Data
US 2011/0019292 A1    Jan. 27, 2011

(51) Int. Cl.
G02B 9/00    (2006.01)

(52) U.S. Cl. .................. 359/784; 359/399

(58) Field of Classification Search ............ 359/399, 359/771–795
See application file for complete search history.

(56) References Cited

U.S. PATENT DOCUMENTS

| | | | |
|---|---|---|---|
| 3,476,463 A | 11/1969 | Kreuzer | |
| 5,864,430 A | 1/1999 | Dickey | |
| 6,295,168 B1 | 9/2001 | Hoffnagle | |
| 6,356,395 B1 * | 3/2002 | Tawa et al. | 359/642 |
| 6,433,301 B1 | 8/2002 | Dunsky | |
| 6,487,022 B1 | 11/2002 | Okorogu | |
| 6,654,183 B2 | 11/2003 | Coufal | |
| 6,754,007 B2 * | 6/2004 | Yamakawa et al. | 359/668 |
| 6,791,060 B2 | 9/2004 | Dunsky | |
| 6,801,368 B2 | 10/2004 | Coufal | |
| 6,879,448 B2 | 4/2005 | Hoffnagle | |
| 7,085,062 B2 | 8/2006 | Hauschild | |
| 7,446,957 B2 * | 11/2008 | Tanaami et al. | 359/785 |
| 7,567,388 B2 * | 7/2009 | Tanaami et al. | 359/668 |
| 7,630,147 B1 * | 12/2009 | Kar et al. | 359/716 |
| 7,843,653 B2 * | 11/2010 | Cayer | 359/754 |
| 2003/0053221 A1 | 3/2003 | Coufal | |
| 2004/0004913 A1 * | 1/2004 | Wada et al. | 369/44.32 |
| 2004/0264007 A1 | 12/2004 | Hoffnagle | |

OTHER PUBLICATIONS

John Hoffnagle, et al., Design and Performance of a Refractive Optical System That Converts a Gaussian to a Flattop Beam, Applied Optics, 2000, pp. 5488-5499, vol. 39, No. 30.

David Shealy, et al., Design of GRIN Laser Beam Shaping System, SPIE, 2004, vol. 5525.

* cited by examiner

Primary Examiner — Darryl J Collins
(74) Attorney, Agent, or Firm — Brian S. Steinberger; Phyllis K. Wood; Law Offices of Brian S. Steinberger, P.A.

(57) ABSTRACT

An achromatic refractive beam shaping optical system that transforms the intensity distribution of a light beam, preferably provides transformation of a beam which intensity distribution described by Gaussian function to a beam of uniform intensity. The system consists of at least two lens groups, one of lens groups is made from at least two lenses having different characteristics, of spectral dispersion, thus achromatic for a certain spectral range optical design providing zero or negligible for practical applications wave aberration is realized. By choosing parameters of lens groups the system can be realized as a telescope of Galilean or Keplerian type, or as a collimator, or as an objective lens. To provide adjustment features one lens group of the system is movable along the optical axis.

25 Claims, 2 Drawing Sheets

ACHROMATIC OPTICAL SYSTEM FOR BEAM SHAPING

FIELD OF INVENTION

The present invention relates to the field of optics; in particular to optical systems for beam shaping being intended to transform intensity distribution of light beam. The invention can be applied in laser optics.

BACKGROUND TO THE INVENTION

Lasers are widely applied in various applications in industry and their effective using is very important. Typically the intensity profile of laser sources is described by Gaussian function provided by physics of creating the laser radiation. From one side, this Gaussian profile provides high energy concentration, however, from another side for many industrial applications it is not an optimum one because of non-uniform intensity distribution within the laser beam. In such applications like welding, soldering, annealing, illumination of spatial light modulators, holography a homogenized laser beam is most preferable from the point of view of saving the energy and providing the same conditions of material treatment in the beam area. Therefore, the task of re-distribution of energy within the laser beam to provide uniform intensity profile is an actual industrial task; very often it is called as beam shaping.

In one of solutions used to transform the intensity distribution it is presumed that laser beam is either truncated by an aperture or attenuated by specially designed filter with non-uniform transmission function, so called apodizing filters. Losing of laser energy is an evident disadvantage of this solution. It is unacceptable in high power applications.

Another way to provide uniform intensity in a certain location is applying of arrays of microlenses, micromirrors, prisms or diffractive optical elements (DOE) to divide the source laser beam to small parts, beamlets. Light from all beamlets is then collected to a certain working plane with using additional optical components in such a way that each point of said working plane gets the portion of light from each beamlet. Thus, the final intensity of each point of working plane is defined by integration of light from all beamlets. An obvious disadvantage of this integration approach is using of complicated, difficult to produce and expensive array optical elements. On the other hand the uniform intensity distribution is realized in a certain plane only and degrades rapidly while shifting from that plane along the optical axis; this feature is a critical one for applications where increased depth of field is required. In case of applying the DOE the range of applications can be limited because of unaccepted diffraction losses.

One more approach used is field mapping systems providing intensity profile transformation in a controlled manner, for example Gaussian intensity profile of a single mode laser to uniform intensity distribution. This transformation could be realized with using diffractive optical elements (DOE), gradient-index lenses, specially designed aspheric lenses or off-axis aspheric mirrors. The known solutions present telescopes transforming collimated input Gaussian laser beam to collimated output beam of uniform intensity, the wave aberration of this optical system is zero or negligible for a particular application. One of important features of field mapping systems is that the uniform intensity profile is provided over long distance after a system.

Using diffractive optical elements in field mapping optical systems is limited by unaccepted diffraction losses that are critical in high power applications. The solution based on applying of mirrors suffers from complexity and expensiveness of their manufacturing due to off-axis design, difficulties of shop testing and proper assembling.

Modern optical technologies of making such refractive optical systems like gradient-index and aspheric lenses let it possible to provide reliable production of refractive field mapping systems realizing necessary basic design conditions: a proper transformation of input Gaussian laser beam to a beam of uniform intensity profile and zero wave aberration. The serious problem of conventional refractive field mapping systems is that these two basic design conditions can be fulfilled for a certain wavelength only. When switching to another working wavelength and trying to provide uniform intensity distribution it would be necessary to change some parameters of known refractive field mapping systems (for example, distance between lens groups of a telescope), in this case, however, it is impossible to keep simultaneously zero wave aberration and, hence, avoid interference effects destroying the uniformity of the intensity profile. There exists a technical solution to solve this problem of refractive field mapping systems consisting in adding to a field mapping system a suitable achromatizing optics, thus a complete optical system has several independent parts being responsible, separately, for the functions of beam shaping and adaptation of a beam shaper to an intended wavelength range. Evidently, this way leads to increasing of components of a complete optical system that reduces its transmission, makes it more expensive, complicated and, hence, less reliable, more sensitive to misalignments, difficult to use in practice.

Thus, the known field mapping solutions cannot provide an efficient, reliable, easy to use optical system for a simultaneous beam profile transformation for two wavelengths or a range of wavelengths.

There are several reasons why it is important to provide the same conditions of beam intensity transformation for more than one working wavelength simultaneously. This is required for some types of laser applications like spectroscopy, fluorescence technologies, confocal microscopy, and material processing with using broad-band laser sources or short-pulsed lasers. Another reason relates to manufacturing of the beam shaping systems themselves—while assembling they should be tested for wavefront aberration with using interferometers. Most often interferometers are based on He—Ne laser of 632.8 nm wavelength, on the other hand in real application the beam shaping system is working with another laser, for example, with Nd:YAG laser of 1064 nm wavelength. Thus, to provide rate conditions both for shop testing and for reliable operation in real application the field mapping system should be designed with a necessary wave aberration correction level for these wavelengths simultaneously.

Important disadvantage of conventional beam mapping systems is that they have afocal design only, hence both input and output laser beam have to be collimated. At the same time very often real applications require either collimating of a divergent laser beam or focusing of a collimated beam, therefore, combining of these functions with beam shaping in a sole optical system lets it possible to simplify the optical design of a laser system.

Thus, from the point of view real conditions of manufacturing and using in real laser applications the conventional solutions aren't optimal.

The object of the present invention is to realize a beam shaping system capable to provide a necessary intensity distribution transformation for laser beams in a wide spectrum range, keep a resulting intensity distribution over a long distance, operate with collimated and divergent laser beams, and provide easy adjustment to a particular laser beam.

SUMMARY OF THE INVENTION

This object is achieved by an achromatic refractive field mapping system that transforms the intensity distribution of input light beam having circular symmetry to another intensity distribution of output light beam. This achromatic optical system consists of at least two lens groups and provides zero or negligible for practical applications wave aberration, thus providing equal path lengths for the rays of input beam. The conditions of intensity distribution transformation and zero or negligible wave aberration are fulfilled simultaneously for a certain spectral range, thus providing the same operation of the achromatic optical system at each wavelength of this spectral range.

According to one, non limiting, embodiment of this invention the achromatic optical system is a telescope requiring a collimated input light beam and providing a collimated output beam. There are possible two versions of the telescope: Galilean type without internal focusing of light in the space between the telescope lens groups, or Keplerian type with focusing of light in the space between the telescope lens groups.

According to another, non limiting, embodiment of this invention the achromatic optical system is a collimator requiring a divergent input light beam and providing a collimated output beam.

According to one more, non-limiting, embodiment of this invention the achromatic optical system is an objective lens requiring a collimated input light beam and providing a convergent output beam.

Advantageously one of lens groups of the achromatic optical system is made from at least two lenses having different characteristics of dispersion, for example Abbe numbers. By choosing the combination of focal powers and dispersion coefficients of the lenses all necessary features of the achromatic optical system are realized.

Advantageously the achromatic optical system operates with laser beams which cross-section intensity distribution is described by the Gaussian function or a similar function having peak intensity in the center of a beam and steadily decreasing of intensity towards the beam periphery. These intensity distributions are characteristic ones for most of laser sources, both for divergent and collimated beams.

Advantageously, but not limiting, the achromatic optical system provides the transformation of intensity distribution of input beam to uniform intensity distribution of output beam. Uniform intensity distribution is very often required in laser applications, however other intensity distributions could be, also, provided by the achromatic optical system.

Advantageously the lens groups of the achromatic optical system are made of lenses having either spherical or aspherical optical surfaces. By choosing the combination of optical characteristics of the lenses all necessary features of the achromatic optical system are realized.

Advantageously one lens group of the achromatic optical system is movable along the optical axis. Its motion is used to provide fine adjustments of the optical systems in the conditions of real applications, for example, to compensate the deviation of divergence of input beam from a rate value.

Further objects and advantages of this invention will be apparent from the following detailed description of preferred embodiments which are illustrated schematically in the accompanying drawings.

BRIEF DESCRIPTION OF THE DRAWINGS

The invention is illustrated, without limitation, by the accompanying drawings, which are briefly described below.

DETAILED DESCRIPTION OF THE INVENTION

Figures and the various embodiments used to describe the principles of the present invention are by way of illustration and should not be construed in any way to limit the scope of the invention. Those skilled in the art will understand that the principles of the present invention may be implemented in a variety of laser devices.

According to this invention there are realized various optical systems for beam shaping that relate to the refractive systems of field mapping type and provide transformation of the intensity distribution of input light beam having circular symmetry to another intensity distribution of output light beam. This transformation is realized through distortion of the beam wavefront inside the optical system under the condition of conservation of energy that could be formulated as follows wherein $$\int_0^{r_{in}} I_{in}(\rho)\rho d\rho = \int_0^{r_{out}} I_{out}(\rho)\rho d\rho \qquad (1)$$

$\rho$ designates a variable beam radius in polar coordinates;
$I_{in}(\rho)$ designates intensity distribution function of the input light beam;
$r_{in}$ designates a radius of the input beam subjected to intensity redistribution;
$I_{out}(\rho)$ designates intensity distribution function of the output light beam;
$r_{out}$ designates a radius of the output beam resulting after the intensity redistribution.

The intensity redistribution could be realized for various light beams, however most often in the practice it is necessary to convert $TEM_{00}$ laser beams, which intensity distribution is described by Gaussian function (these beams are called as Gaussian beams), to beams of uniform intensity (flattop). Accordingly, without limitation of the essence of invention, the intensity distributions of input and output beams could be defined as $$I_{in}(\rho) = I_{in0}\exp(-2\cdot\rho^2/\omega^2) \qquad (2)$$

$$I_{out}(\rho) = \begin{cases} I_{out0} & \text{for } r \leq r_{out} \\ 0 & \text{for } r > r_{out} \end{cases} \quad (3)$$

wherein

ω designates a waist radius of the Gaussian laser beam;

$I_{in0}$, $I_{out0}$ are constants.

In addition to Gaussian laser beams the optical systems according to present invention can operate with beams with a cross-section intensity distribution that is described by Gaussian-like functions having peak intensity in the center of a beam and steadily decreasing of intensity towards the beam periphery. As non-limiting examples of such functions are supergaussian functions described as $$I_{in}(\rho) = I_{in0} \exp(-2 \cdot \rho^n / \omega^n), \quad (4)$$

where n>2;

or parabolic functions, for example $$I_{in}(\rho) = I_{in0}(1 - \rho^2 / r_{in}^2). \quad (5)$$

Essential feature of the optical systems according to present invention is providing zero or negligible for practical applications wave aberration, this means equal path lengths for all rays of input beam passing through the optical system; this condition is very important for practice since guarantees avoidance of appearing undesirable interference after the optical system, as well as provides keeping the result intensity profile over long distance after the optical system.

One of advantages of the optical systems according to present invention over conventional approaches is in their achromatic design that guarantees simultaneous fulfillment of above described conditions of intensity redistribution and zero or negligible wave aberration for a certain spectral range, as result the achromatic optical systems provide the same operation at each wavelength of this spectral range. This feature is realized by using materials with different dispersion characteristics for lenses of the optical systems. The condition of achromatization could be formulated in form of combined equations linking the focal powers of lenses, distances between them and Abbe numbers of the lenses materials characterizing dispersion features of a material. Advantageously, designs of the optical systems can contain 2 or more lenses, the said combined equations for 2-lens, 3-lens and 4-lens optical systems could be described as follows

- for 2-lens system $$\begin{cases} \varphi_1 + \varphi_2 - \varphi_1 \varphi_2 d_1 = \varphi \\ \varphi_1/v_1 + \varphi_2/v_2 - \varphi_1 \varphi_2 d_1 (1/v_1 + 1/v_2) = 0, \end{cases} \quad (6)$$

- for 3-lens system $$\begin{cases} \varphi_1 + \varphi_2 + \varphi_3 - \varphi_1 \varphi_2 d_1 - \varphi_1 \varphi_3 d_1 - \varphi_1 \varphi_3 d_2 - \varphi_2 \varphi_3 d_2 + \\ \varphi_1 \varphi_2 \varphi_3 d_1 d_2 = \varphi \\ \varphi_1/v_1 + \varphi_2/v_2 + \varphi_3/v_3 - \varphi_1 \varphi_2 d_1 (1/v_1 + 1/v_2) - \\ \varphi_1 \varphi_3 (d_1 + d_2)(1/v_1 + 1/v_3) - \varphi_2 \varphi_3 d_2 (1/v_2 + 1/v_3) + \\ \varphi_1 \varphi_2 \varphi_3 d_1 d_2 (1/v_1 + 1/v_2 + 1/v_3) = 0, \end{cases} \quad (7)$$

- for 4-lens system $$\begin{cases} \varphi_1 + \varphi_2 + \varphi_3 + \varphi_4 - \varphi_1 \varphi_2 d_1 - \varphi_2 \varphi_3 d_2 - \varphi_3 \varphi_4 d_3 - \\ \varphi_1 \varphi_3 (d_1 + d_2) - \varphi_2 \varphi_4 (d_2 + d_3) - \varphi_1 \varphi_4 (d_1 + d_2 + d_3) + \\ \varphi_1 \varphi_2 \varphi_3 d_1 d_2 + \varphi_2 \varphi_3 \varphi_4 d_2 d_3 + \varphi_1 \varphi_2 \varphi_4 (d_1 d_2 + d_1 d_3) + \\ \varphi_1 \varphi_3 \varphi_4 (d_1 d_3 + d_2 d_3) - \varphi_1 \varphi_2 \varphi_3 \varphi_4 d_1 d_2 d_3 = \varphi \\ \varphi_1/v_1 + \varphi_2/v_2 + \varphi_3/v_3 + \varphi_4/v_4 - \varphi_1 \varphi_2 d_1 (1/v_1 + 1/v_2) - \\ \varphi_2 \varphi_3 d_2 (1/v_2 + 1/v_3) - \varphi_3 \varphi_4 d_3 (1/v_3 + 1/v_4) - \varphi_1 \varphi_3 (d_1 + d_2) \\ (1/v_1 + 1/v_3) - \varphi_2 \varphi_4 (d_2 + d_3)(1/v_2 + 1/v_4) - \\ \varphi_1 \varphi_4 (d_1 + d_2 + d_3)(1/v_1 + 1/v_4) + \\ \varphi_1 \varphi_2 \varphi_3 d_1 d_2 (1/v_1 + 1/v_2 + 1/v_3) + \\ \varphi_2 \varphi_3 \varphi_4 d_2 d_3 (1/v_2 + 1/v_3 + 1/v_4) + \varphi_1 \varphi_2 \varphi_4 (d_1 d_2 + d_1 d_3) \\ (1/v_1 + 1/v_2 + 1/v_4) + \\ \varphi_1 \varphi_3 \varphi_4 (d_1 d_3 + d_2 d_3)(1/v_1 + 1/v_3 + 1/v_4) - \\ \varphi_1 \varphi_2 \varphi_3 \varphi_4 d_1 d_2 d_3 (1/v_1 + 1/v_2 + 1/v_3 + 1/v_4) = 0, \end{cases} \quad (8)$$

φ designates focal power of the optical system, inversely proportional to focal length of the optical system, φ=0 in case of afocal system;

$\phi_1$, $\phi_2$, $\phi_3$, $\phi_4$ designate focal powers of lenses, inversely proportional to focal length of lenses, a number indexing indicates the order of the lenses in the optical system from the side of input of laser radiation;

$v_1$, $v_2$, $v_3$, $v_4$ designate Abbe numbers of the material of lenses, a number indexing indicates the order of the lenses in the optical system from the side of input of laser radiation;

$d_1$, $d_2$, $d_3$ designate distances between lenses, a number index corresponds to the number of a lens in the optical system that is front among the adjacent lenses;

Advantageously, but not limiting, the lenses of the optical systems according to present invention being intended to operate with laser sources in visual and near-infrared spectrum can be made from crown or flint glasses, in case of UV-lasers the fused silica and $CaF_2$ could be applied.

Providing of the same operation of the achromatic optical systems at each wavelength of the certain spectral range makes these systems very useful in the applications where several laser sources are applied simultaneously, for example in spectroscopy, fluorescence biomedical technologies, confocal microscopy. This feature is very important, also, in material processing technologies where various lasers are applied in one technology cycle.

Another advantage of the optical systems according to present invention over conventional approaches is their implementation not only as afocal optical systems (telescopes), but also as optical systems of focal power like collimator or objective. The telescopic, or afocal, systems require a collimated input light beam and provide a collimated output beam; there are realizable both basic versions of telescopic systems: Galilean type without internal focusing of light in the space between the telescope lens groups, or Keplerian type with focusing of light in the space between the telescope lens groups. In addition to afocal optical systems there are realizable systems of focal power: collimator type requiring a divergent input light beam and providing a collimated output beam, and objective type requiring a collimated input light beam and providing a convergent output beam. Since the collimator and objective type optical systems according to present invention combine the function of beam shaping with functions of a beam collimation or focusing they reduce complexity and, hence, increase reliability of laser systems. As an example, the collimator type beam shaping system is a complete solution to provide a uniform intensity distribution of a beam from fiber laser.

One more advantage of the optical systems according to present invention over conventional approaches is in possibility of moving of one of lens groups along the optical axis, this feature is used to provide fine adjustments of the optical systems in the conditions of real applications. As an example, in the beam shaping optical system of telescope type this moving is used to compensate the divergence of a collimated input laser beam that could be either convergent or divergent at the input of the beam shaping optical system. The lens group moving can be used, also, to optimize operation of the beam shaping system at a certain wavelength; examples of this optimization are presented below.

Several embodiments of the present invention will now be described using actual numerical values; these various embodiments used to describe the principles of the present invention are by way of illustration and should not be construed in any way to limit the scope of the invention.

According to non-limiting Embodiment 1 of the present invention there is provided a Galilean type afocal achromatic beam shaping system of two lens groups: first lens group consists of one negative lens where one optical surface is aspheric, second lens group consists of two lenses made from different materials with different dispersion characteristics. Most often the Abbe number is a commonly used characteristic of dispersion features of optical materials; therefore just this value is used in further descriptions of all Embodiments of the present invention.

Table 1, below, shows the values of the radius of curvature R (in mm) of each lens surface, the on-axis surface spacing d (in mm), as well as the values of the index of refraction $n_d$ and the Abbe number $v_d$ of the material of each lens given for the wavelength of sodium d line, additionally there is given the value D (in mm) of the input beam diameter at $1/e^2$ intensity. The surface numbers (#) in the table indicate the order of the surfaces from the side of input of laser radiation.

TABLE 1

| # | R | d | $n_d$ | $v_d$ |
|---|---|---|---|---|
|   |   | Infinity |   |   |
| 1 | Infinity | 1.0 | 1.60342 | 38.03 |
| 2* | 5.682 | 35.0 |   |   |
| 3 | 21.626 | 1.0 | 1.60342 | 38.03 |
| 4 | 5.104 | 1.3 |   |   |
| 5* | 14.36 | 2.4 | 1.65844 | 50.88 |
| 6 | Infinity |   |   |   |

D = 3.4

In addition, the surfaces in the Table 1 with an * to the right of the surface numbers are made to be aspheric. The shapes of aspheric surfaces are described as tabulated functions of sag (in mm) in the Table 2, where h is the surface height (in mm).

TABLE 2

| | Surface 2 | | Surface 5 |
|---|---|---|---|
| h | Sag | h | Sag |
| 0.0 | 0.0000 | 0.0 | 0.0000 |
| 0.1 | 0.0003 | 0.2 | 0.0029 |
| 0.2 | 0.0013 | 0.4 | 0.0114 |
| 0.3 | 0.0030 | 0.6 | 0.0257 |
| 0.4 | 0.0053 | 0.8 | 0.0458 |
| 0.5 | 0.0081 | 1.0 | 0.0718 |
| 0.6 | 0.0115 | 1.2 | 0.1036 |
| 0.7 | 0.0153 | 1.4 | 0.1415 |
| 0.8 | 0.0195 | 1.6 | 0.1854 |
| 0.9 | 0.0240 | 1.8 | 0.2356 |
| 1.0 | 0.0287 | 2.0 | 0.2921 |
| 1.1 | 0.0336 | 2.2 | 0.3551 |

TABLE 2-continued

| | Surface 2 | | Surface 5 |
|---|---|---|---|
| h | Sag | h | Sag |
| 1.2 | 0.0386 | 2.4 | 0.4247 |
| 1.3 | 0.0436 | 2.6 | 0.5010 |
| 1.4 | 0.0485 | 2.8 | 0.5842 |
| 1.5 | 0.0534 | 3.0 | 0.6741 |
| 1.6 | 0.0581 | 3.2 | 0.7708 |
| 1.7 | 0.0626 | 3.4 | 0.8739 |
| 1.8 | 0.0669 | 3.6 | 0.9830 |
| 1.9 | 0.0710 | 3.8 | 1.0974 |
| 2.0 | 0.0749 | 4.0 | 1.2161 |

Figure 1A:
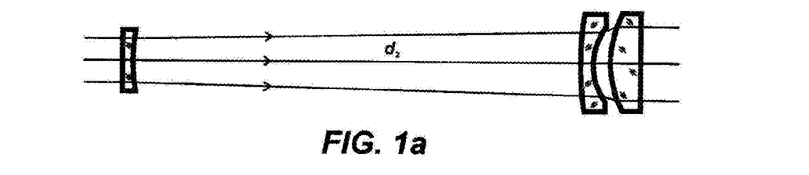
FIG. 1a is a schematic drawing of the achromatic optical system for beam shaping according to one of embodiments of the invention, just Galilean telescope.
Figure 1B:
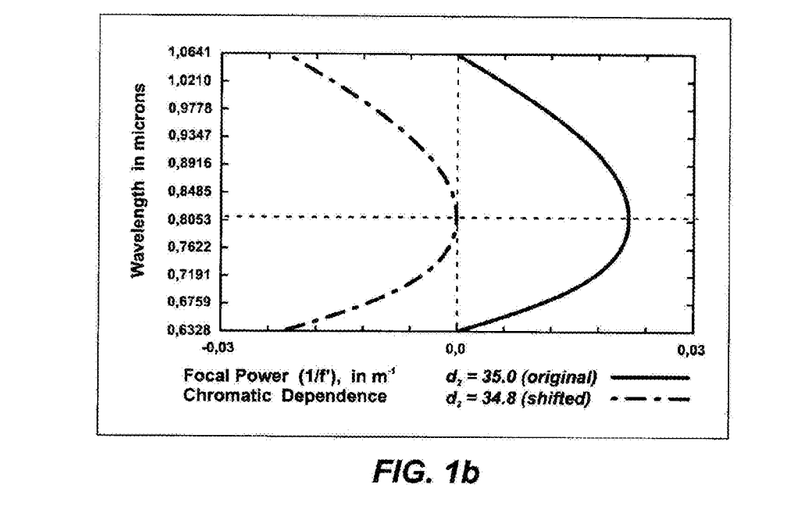
FIG. 1b is a graph showing variation of focal power (reverse to focal length) of one of embodiments of the invention described by the FIG. 1a in a certain wavelength range.
Figure 2:
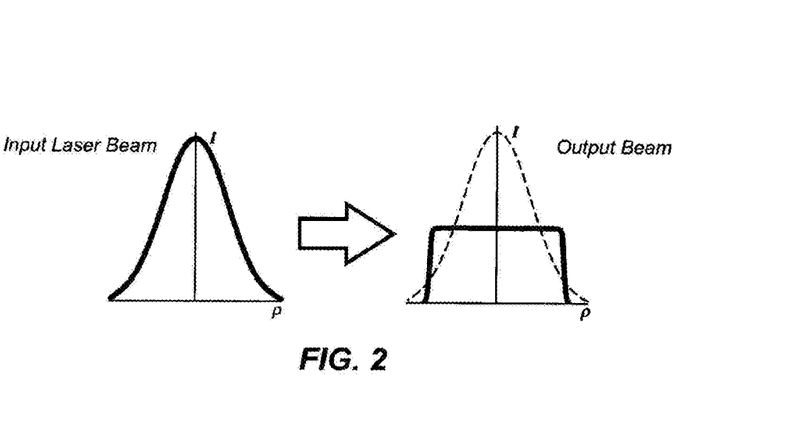
FIG. 2 is a schematic diagram showing transformation of intensity distribution realized by one of embodiments of the invention.
Figure 3A:
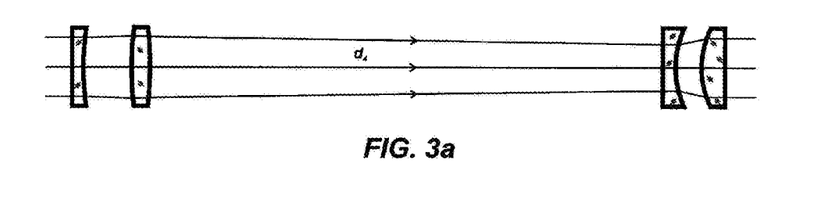
FIG. 3a is a schematic drawing of the achromatic optical system for beam shaping according to another embodiment of the invention, just Galilean telescope.
Figure 3B:
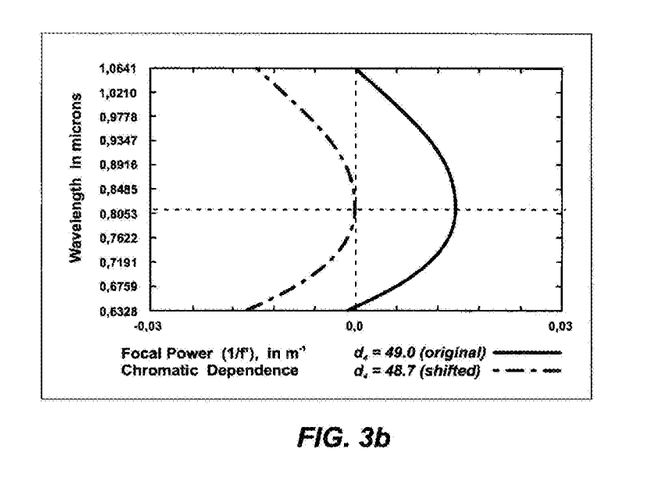
FIG. 3b is a graph showing dependence of focal power (reverse to focal length) of another embodiment of the invention described by the FIG. 3a in a certain wavelength range.

FIG. 1a shows optical layout of the achromatic beam shaping system according to the Embodiment 1 and FIG. 1b illustrates functional dependence of focal power (reverse to focal length) of this system on wavelength in a certain spectral range—boundary wavelengths of the range are 632.8 nm (He—Ne laser) and 1064.1 nm (Nd:YAG laser), solid graph corresponds to original settings of the system. Obviously, originally the beam shaping system according to Embodiment 1 is strictly afocal simultaneously at boundary wavelengths (focal power is equal to "0"), thus, the condition of achromatization is fulfilled. The maximum of focal power within the considered spectral range is achieved at the wavelength approximately 810 nm, and its value is 0.022 $m^{-1}$—this corresponds to focal length about 45 meter. For majority of real laser applications this value of focal length can be considered as practical infinity, for example, numerical aperture of output beam is below the natural divergence of a $TEM_{00}$ laser beam at this wavelength. By changing the distance $d_2$ between the lens groups the focal power at 810 nm can be compensated, in FIG. 1b the functional dependence of focal power in case of changed distance $d_2$ is shown by dashed line. A schematic diagram showing transformation of intensity distribution realized by the achromatic beam shaping system according to the Embodiment 1 is presented at FIG. 2. Another non-limiting embodiment of the present invention, Embodiment 2, is illustrated by FIG. 3a and FIG. 3b. The Galilean type afocal achromatic beam shaping system consists of two lens groups, both lens groups consists of two lenses, in each lens group the lenses are made from different materials with different dispersion characteristics (Abbe numbers). Table 3, below, shows the values of the radius of curvature R (in mm) of each lens surface, the on-axis surface spacing d (in mm), as well as the values of the index of refraction $n_d$ and the Abbe number $v_d$ of the material of each lens given for the wavelength of sodium d line, additionally there is given the value D (in mm) of the input beam diameter at $1/e^2$ intensity. The surface numbers (#) in the table indicate the order of the surfaces from the side of input of laser radiation.

TABLE 3

| # | R | d | $n_d$ | $v_d$ |
|---|---|---|---|---|
|   |   | Infinity |   |   |
| 1 | Infinity | 1.5 | 1.64769 | 33.85 |
| 2* | 6.365 | 3.8 |   |   |
| 3 | 76.3 | 2.0 | 1.60562 | 43.93 |
| 4 | −76.3 | 49.0 |   |   |
| 5 | Infinity | 1.0 | 1.64769 | 33.85 |
| 6 | 7.297 | 2.8 |   |   |
| 7* | 11.79 | 2.4 | 1.60562 | 43.93 |
| 8 | Infinity |   |   |   |

D = 6

In addition, the surfaces in the Table 3 with * to the right of the surface numbers are made to be aspheric. The shapes of aspheric surfaces are described as tabulated functions of sag (in mm) in the Table 4, where h is the surface height (in mm).

TABLE 4

| h | Surface 2 Sag | h | Surface 7 Sag |
|---|---|---|---|
| 0.0 | 0.0000 | 0.0 | 0.0000 |
| 0.2 | 0.0006 | 0.2 | 0.0024 |
| 0.4 | 0.0025 | 0.4 | 0.0096 |
| 0.6 | 0.0055 | 0.6 | 0.0216 |
| 0.8 | 0.0097 | 0.8 | 0.0383 |
| 1.0 | 0.0149 | 1.0 | 0.0599 |
| 1.2 | 0.0211 | 1.2 | 0.0861 |
| 1.4 | 0.0282 | 1.4 | 0.1172 |
| 1.6 | 0.0361 | 1.6 | 0.1529 |
| 1.8 | 0.0447 | 1.8 | 0.1933 |
| 2.0 | 0.0538 | 2.0 | 0.2384 |
| 2.2 | 0.0634 | 2.2 | 0.2881 |
| 2.4 | 0.0733 | 2.4 | 0.3423 |
| 2.6 | 0.0835 | 2.6 | 0.4008 |
| 2.8 | 0.0939 | 2.8 | 0.4634 |
| 3.0 | 0.1045 | 3.0 | 0.5298 |
| 3.2 | 0.1152 | 3.2 | 0.5996 |
| 3.4 | 0.1260 | 3.4 | 0.6720 |
| 3.6 | 0.1370 | 3.6 | 0.7461 |
| 3.8 | 0.1482 | 3.8 | 0.8207 |
| 4.0 | 0.1595 | 4.0 | 0.8940 |
| 4.2 | 0.1711 | 4.2 | 0.9640 |
| 4.4 | 0.1829 | 4.4 | 1.0276 |
| 4.6 | 0.1949 | 4.6 | 1.0813 |
| 4.8 | 0.2071 | 4.8 | 1.1204 |
| 5.0 | 0.2193 | 5.0 | 1.1391 |

FIG. 3a shows optical layout of the achromatic beam shaping system according to the Embodiment 2 and FIG. 3b illustrates functional dependence of focal power (reverse to focal length) of this system on wavelength in a certain spectral range—boundary wavelengths of the range are 632.8 nm (He—Ne laser) and 1064.1 nm (Nd:YAG laser), solid graph corresponds to original settings of the system. Obviously, originally the beam shaping system according to Embodiment 2 is strictly afocal simultaneously at boundary wavelengths (focal power is equal to "0"), thus, the condition of achromatization is fulfilled. The maximum of focal power within the considered spectral range is achieved at the wavelength approximately 810 nm, and its value is 0.014 m$^{-1}$— this corresponds to focal length about 70 meter. Obviously, for majority of real laser applications this value of focal length can be considered as practical infinity, for example, numerical aperture of output beam is below the natural divergence of a TEM$_{00}$ laser beam at this wavelength. By changing the distance d$_4$ between the lens groups the focal power at 810 nm can be compensated, in FIG. 3b the functional dependence of focal power in case of changed distance d$_4$ is shown by dashed line.

Figure 4:
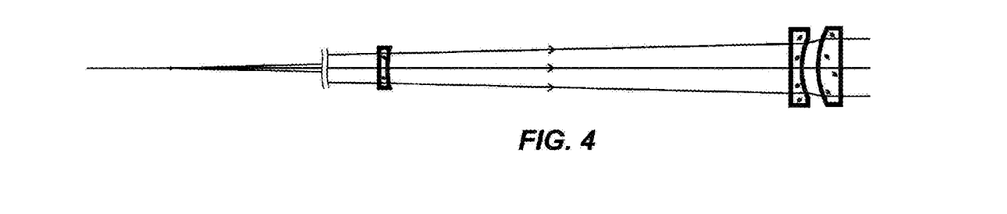
FIG. 4a is a schematic drawing of the achromatic optical system for beam shaping according to one more embodiment of the invention, just collimator.

One more non-limiting embodiment of the present invention, Embodiment 3, is illustrated by FIG. 4 where its optical layout is shown. The collimating type achromatic beam shaping system consists of two lens groups: first lens group consists of one negative lens where one optical surface is concave aspheric, second lens group consists of two lenses made from different materials with different dispersion characteristics (Abbe numbers).

Table 5, below, shows the values of the radius of curvature R (in mm) of each lens surface, the on-axis surface spacing d (in mm), as well as the values of the index of refraction n$_d$ and the Abbe number v$_d$ of the material of each lens given for the wavelength of sodium d line, additionally there is given the value D (in mm) of the input beam diameter at the input of the beam shaping system according to Embodiment 3 at 1/e$^2$ intensity and the value w of the full input aperture angle at 1/e$^2$ intensity. The surface numbers (#) in the table indicate the order of the surfaces from the side of input of laser radiation.

TABLE 5

| # | R | d | n$_d$ | v$_d$ |
|---|---|---|---|---|
|  |  | Infinity |  |  |
| 1 | Infinity | 1.0 | 1.61659 | 36.63 |
| 2* | 7.655 | 49.0 |  |  |
| 3 | Infinity | 1.0 | 1.61659 | 36.63 |
| 4 | 7.327 | 1.7 |  |  |
| 5* | 14.959 | 2.4 | 1.68900 | 49.71 |
| 6 | Infinity |  |  |  |

D = 3
w = 25 mrad

In addition, the surfaces in the Table 5 with * to the right of the surface numbers are made to be aspheric. The shapes of aspheric surfaces are described as tabulated functions of sag (in mm) in the Table 6, where h is the surface height (in mm).

TABLE 6

| h | Surface 2 Sag | h | Surface 5 Sag |
|---|---|---|---|
| 0.0 | 0.0000 | 0.0 | 0.0000 |
| 0.1 | 0.0002 | 0.2 | 0.0024 |
| 0.2 | 0.0008 | 0.4 | 0.0096 |
| 0.3 | 0.0017 | 0.6 | 0.0217 |
| 0.4 | 0.0030 | 0.8 | 0.0385 |
| 0.5 | 0.0045 | 1.0 | 0.0602 |
| 0.6 | 0.0063 | 1.2 | 0.0867 |
| 0.7 | 0.0083 | 1.4 | 0.1180 |
| 0.8 | 0.0105 | 1.6 | 0.1542 |
| 0.9 | 0.0127 | 1.8 | 0.1952 |
| 1.0 | 0.0149 | 2.0 | 0.2410 |
| 1.1 | 0.0171 | 2.2 | 0.2917 |
| 1.2 | 0.0192 | 2.4 | 0.3471 |
| 1.3 | 0.0211 | 2.6 | 0.4073 |
| 1.4 | 0.0228 | 2.8 | 0.4722 |
| 1.5 | 0.0243 | 3.0 | 0.5416 |
| 1.6 | 0.0255 | 3.2 | 0.6153 |
| 1.7 | 0.0265 | 3.4 | 0.6929 |
| 1.8 | 0.0272 | 3.6 | 0.7741 |
| 1.9 | 0.0276 | 3.8 | 0.8582 |
| 2.0 | 0.0277 | 4.0 | 0.9444 |

The Embodiment 3 of the present invention provides combining in a sole optical system the functions of the laser beam collimation as well as beam shaping.

The invention being thus described may be varied in many ways. Such variations are not to be considered as a departure from the spirit and scope of the invention. For example, the achromatic beam shaping system can consist of more than two lens groups with various numbers of lenses. Also, the appropriate selection of the shape of the lens elements which comprise each of the lens groups, the number of aspheric surfaces, and the shape of the aspheric surfaces may be varied. All such modifications as would be obvious to one skilled in the art are intended to be included within the scope of the following claims.

I claim:

1. A refractive achromatic optical system to transform an intensity distribution of an input light beam comprising:
   a first lens group having at least one lens for receiving a collimated input light beam; and a second lens group aligned with the first lens group and separated by a distance, the second lens group having two lenses each made from materials having different coefficients of dispersion to receive the first lens group output beam and produce a transformed output beam having an intensity distribution and is corrected for the wave aberration, the refractive achromatic optical system is incorporated for a telescoping operation receiving the collimated input light beam and producing a collimated output beam.

2. The optical system of claim 1 wherein the lenses from the first lens group and the second lens group form a three-lens system, the lenses made of materials having different coefficients of dispersion according to $$\phi_1+\phi_2+\phi_3-\phi_1\phi_2 d_1-\phi_1\phi_3 d_1-\phi_1\phi_3 d_2-\phi_2\phi_3 d_2+\phi_1\phi_2\phi_3 d_1 d_2 = \phi$$

$$\phi_1/v_1+\phi_2/v_2+\phi_3/v_3-\phi_1\phi_2 d_1(1/v_1+1/v_2)-\phi_1\phi_3(d_1+d_2)(1/v_1+1/v_3)-\phi_2\phi_3 d_2(1/v_2+1/v_3)+\phi_1\phi_2\phi_3 d_1 d_2(1/v_1+1/v_2+1/v_3)=0$$

where $\phi$ designates focal power of the optical system, inversely proportional to focal length of the optical system, $\phi=0$ in case of afocal system;

$\phi_1$, $\phi_2$, $\phi_3$, designate focal powers of lenses, inversely proportional to focal length of lenses;

$v_1$, $v_2$, $v_3$, designate Abbe numbers (coefficients of dispersion) of the material of lenses; and $d_1$, $d_2$ designate distances between lenses.

3. The optical system of claim 1 wherein the lenses from the first lens group and the second lens group form a four-lens system, the lenses made of materials having different coefficients of dispersion according to $$\varphi_1 + \varphi_2 + \varphi_3 + \varphi_4 - \varphi_1\varphi_2 d_1 - \varphi_2\varphi_3 d_2 - \varphi_3\varphi_4 d_3 - \varphi_1\varphi_3(d_1 + d_2) -$$
$$\varphi_2\varphi_4(d_2 + d_3) - \varphi_1\varphi_4(d_1 + d_2 + d_3) + \varphi_1\varphi_2\varphi_3 d_1 d_2 + \varphi_2\varphi_3\varphi_4 d_2 d_3 +$$
$$\varphi_1\varphi_2\varphi_4(d_1 d_2 + d_1 d_3) + \varphi_1\varphi_3\varphi_4(d_1 d_3 + d_2 d_3) - \varphi_1\varphi_2\varphi_3\varphi_4 d_1 d_2 d_3 = \varphi$$

$$\varphi_1/v_1 + \varphi_2/v_2 + \varphi_3/v_3 + \varphi_4/v_4 - \varphi_1\varphi_2 d_1(1/v_1 + 1/v_2) -$$
$$\varphi_2\varphi_3 d_2(1/v_2 + 1/v_3) - \varphi_3\varphi_4 d_3(1/v_3 + 1/v_4) -$$
$$\varphi_1\varphi_3(d_1 + d_2)(1/v_1 + 1/v_3) - \varphi_2\varphi_4(d_2 + d_3)(1/v_2 + 1/v_4) -$$
$$\varphi_1\varphi_4(d_1 + d_2 + d_3)(1/v_1 + 1/v_4) + \varphi_1\varphi_2\varphi_3 d_1 d_2(1/v_1 + 1/v_2 + 1/v_3) +$$
$$\varphi_2\varphi_3\varphi_4 d_2 d_3(1/v_2 + 1/v_3 + 1/v_4) +$$
$$\varphi_1\varphi_2\varphi_4(d_1 d_2 + d_1 d_3)(1/v_1 + 1/v_2 + 1/v_4) +$$
$$\varphi_1\varphi_3\varphi_4(d_1 d_3 + d_2 d_3)(1/v_1 + 1/v_3 + 1/v_4) -$$
$$\varphi_1\varphi_2\varphi_3\varphi_4 d_1 d_2 d_3(1/v_1 + 1/v_2 + 1/v_3 + 1/v_4) = 0,$$

wherein $\phi$ designates focal power of the optical system, inversely proportional to focal length of the optical system, $\phi=0$ in case of afocal system;

$\phi_1$, $\phi_2$, $\phi_3$, $\phi_4$ designate focal powers of lenses, inversely proportional to focal length of lenses;

$v_1$, $v_2$, $v_3$, $v_4$ designate Abbe numbers (coefficients of dispersion) of the material of lenses; and $d_1$, $d_2$, $d_3$ designate distances between lenses.

4. The optical system of claim 1 wherein the input beam comprises:

an input Gaussian laser beam having a peak intensity at the center of the beam and decreasing in intensity towards the beam periphery according to $$I_{in}(\rho)=I_{in0}\exp(-2\cdot\rho^2/\omega^2)$$

where $\rho$ designates a variable beam radius, $I_{in}(\rho)$ designates input intensity distribution function, $\omega$ designates a waist radius of the Gaussian laser beam and $I_{in0}$ is a constant.

5. The optical system of claim 1 wherein the input beam comprises:

an input laser beam having a peak intensity at the center of the beam and decreasing in intensity towards the beam periphery according to $$I_{in}(\rho)=I_{in0}\exp(-2\cdot\rho^n/\omega^n),$$

where $\rho$ designates a variable beam radius, $I_{in}(\rho)$ designates input intensity distribution function, $\omega$ designates a waist radius of the laser beam and $I_{in0}$ is a constant and $n>2$.

6. The optical system of claim 1 wherein the output beam has an intensity distribution according to $$I_{out}(\rho) = \begin{cases} I_{out0} & \text{for } \rho \leq r_{out} \\ 0 & \text{for } \rho > r_{out} \end{cases}$$

wherein $\rho$ designates a variable beam radius, $I_{out}(\rho)$ designates output intensity distribution function, $r_{out}$ designates a radius of the output beam $I_{out0}$ is a constant.

7. The optical system of claim 1 wherein the first lens group and the second lens group includes lenses with spherical surfaces.

8. The optical system of claim 1 wherein the first lens group and the second lens group includes lenses with aspherical surfaces.

9. The optical system of claim 1 wherein one of the first and the second lens groups is movable along the optical axis to provide adjustment, the distance between the lens groups is variable and its value is optimized by the condition of compensation of either residual divergence or convergence of a collimated input beam or deviation of the divergence angle from a rate value in case of a divergent input beam.

10. A refractive achromatic optical system to transform an intensity distribution of an input light beam comprising:

a first lens group having at least one lens for receiving an input light beam, the input beam is one of an input beam having a collimated input beam; and a second lens group aligned with the first lens group and separated by a distance, the second lens group having two lenses each made from materials having different coefficients of dispersion to receive the first lens group output beam and produce a transformed output beam having an intensity distribution and is corrected for the wave aberration, the refractive achromatic optical system is incorporated as a collimator receiving the divergent input beam and producing a collimated output beam.

11. The optical system of claim 10 wherein the input beam comprises:

a Gaussian input laser beam having a peak intensity at the center of the beam and decreasing in intensity towards the beam periphery according to $$I_{in}(\rho)=I_{in0}\exp(-2\cdot\rho^2/\omega^2)$$

where $\rho$ designates a variable beam radius, $I_{in}(\rho)$ designates input intensity distribution function, $\omega$ designates a waist radius of the Gaussian laser beam and $I_{in0}$ is a constant.

12. The optical system of claim 10 wherein the input beam comprises:

an laser input beam having a peak intensity at the center of the beam and decreasing in intensity towards the beam periphery according to $$I_{in}(\rho)=I_{in0}\exp(-2\cdot\rho^n/\omega^n),$$

where ρ designates a variable beam radius, $I_{in}(\rho)$ designates input intensity distribution function, ω designates a waist radius of the laser beam and $I_{in0}$ is a constant and n>2.

13. The optical system of claim 10 wherein the input beam comprises:
an input laser beam having a peak intensity at the center of the beam and decreasing in intensity towards the beam periphery according to $$I_{in}(\rho)=I_{in0}(1-\rho^2/r_{in}^2),$$

where ρ designates a variable beam radius, $I_{in}(\rho)$ designates input intensity distribution function, $r_{in}$ designates a maximum radius of the laser beam and $I_{in0}$ is a constant.

14. The optical system of claim 10 wherein the output beam has an intensity distribution according to $$I_{out}(\rho) = \begin{cases} I_{out0} & \text{for } \rho \leq r_{out} \\ 0 & \text{for } \rho > r_{out} \end{cases}$$

wherein ρ designates a variable beam radius, $I_{out}(\rho)$ designates output intensity distribution function, $r_{out}$ designates a radius of the output beam and $I_{out0}$ is a constant.

15. The optical system of claim 10 wherein the first lens group and the second lens group includes lenses with spherical surfaces.

16. The optical system of claim 10 wherein the first lens group and the second lens group includes lenses with aspherical surfaces.

17. A refractive achromatic optical system to transform an intensity distribution of an input light beam comprising:
a first lens group having at least one lens for receiving an input laser beam having a peak intensity at the center of the beam and decreasing in intensity towards the beam periphery according to $$I_{in}(\rho)=I_{in0}\exp(-2\cdot\rho^n/\omega^n),$$

where ρ designates a variable beam radius, $I_{in}(\rho)$ designates input intensity distribution function, ω designates a waist radius of the laser beam and $I_{in0}$ is a constant and n>2; and
a second lens group aligned with the first lens group and separated by a distance, the second lens group having two lenses each made from materials having different coefficients of dispersion to receive the first lens group output beam and produce a transformed output beam having an intensity distribution and is corrected for the wave aberration.

18. A refractive achromatic optical system to transform an intensity distribution of an input light beam comprising:
a first lens group having at least one lens for receiving an input laser beam having a peak intensity at the center of the beam and decreasing in intensity towards the beam periphery according to $$I_{in}(\rho)=I_{in0}(1-\rho^2/r_{in}^2)$$

where ρ designates a variable beam radius, $I_{in}(\rho)$ designates input intensity distribution function, $r_{in}$ designates a maximum radius of the laser beam and $I_{in0}$ is a constant; and
a second lens group aligned with the first lens group and separated by a distance, the second lens group having two lenses each made from materials having different coefficients of dispersion to receive the first lens group output beam and produce a transformed output beam having an intensity distribution and is corrected for the wave aberration.

19. A refractive achromatic optical system to transform an intensity distribution of an input light beam comprising:
a first lens group having at least one lens for receiving a collimated input light beam having a peak intensity at the center of the beam and decreasing in intensity towards the beam periphery according to $$I_{in}(\rho)=I_{in0}(1-\rho^2/r_{in}^2),$$

where ρ designates a variable beam radius, $I_{in}(\rho)$ designates input intensity distribution function, $r_{in}$ designates a maximum radius of the laser beam and $I_{in0}$ is a constant; and
a second lens group aligned with the first lens group and separated by a distance, the second lens group having two lenses each made from materials having different coefficients of dispersion to receive the first lens group output beam and produce a transformed output beam having an intensity distribution and is corrected for the wave aberration, the refractive achromatic optical system is incorporated as an objective lens receiving the collimated input beam and producing a convergent output beam.

20. A refractive achromatic optical system to transform an intensity distribution of an input light beam comprising:
a first lens group having at least one lens for receiving a collimated input laser beam an input laser beam having a peak intensity at the center of the beam and decreasing in intensity towards the beam periphery according to $$I_{in}(\rho)=I_{in0}\exp(-2\cdot\rho^n/\omega^n),$$

where ρ designates a variable beam radius, $I_{in}(\rho)$ designates input intensity distribution function, ω designates a waist radius of the laser beam and $I_{in0}$ is a constant and n>2; and
a second lens group aligned with the first lens group and separated by a distance, the second lens group having two lenses each made from materials having different coefficients of dispersion to receive the first lens group output beam and produce a transformed output beam having an intensity distribution and is corrected for the wave aberration, wherein the refractive achromatic optical system is incorporated as an objective lens receiving the collimated input beam and producing a convergent output beam.

21. A refractive achromatic optical system to transform an intensity distribution of an input light beam comprising:
a first lens group having at least one lens for receiving an input light beam having one of a circular symmetry, a collimated input beam, or a divergent input beam; and
a second lens group aligned with the first lens group and separated by a distance, the second lens group having two lenses each made from materials having different coefficients of dispersion to receive the first lens group output beam and produce a transformed output beam having an intensity distribution and is corrected for the wave aberration, one of the first and the second lens groups is movable along the optical axis to provide adjustment, the distance between the lens groups is variable and its value is optimized by the condition of compensation of either residual divergence or convergence of a collimated input beam or deviation of the divergence angle from a rate value in case of a divergent input beam.

22. The optical system of claim 21 wherein the output beam has an intensity distribution according to $$I_{out}(\rho) = \begin{cases} I_{out0} & \text{for } \rho \leq r_{out} \\ 0 & \text{for } \rho > r_{out} \end{cases}$$

wherein ρ designates a variable beam radius, $I_{out}(\rho)$ designates output intensity distribution function, $r_{out}$ designates a radius of the output beam and $I_{out0}$ is a constant.

23. The optical system of claim 21 wherein the first lens group and the second lens group includes lenses with spherical surfaces.

24. The optical system of claim 21 wherein the first lens group and the second lens group includes lenses with aspherical surfaces.

25. A refractive achromatic optical system to transform an intensity distribution of an input light beam comprising:
   a first lens group having at least one lens for receiving an input light beam; and
   a second lens group aligned with the first lens group and separated by a distance, the second lens group having two lenses each made from materials having different coefficients of dispersion to receive the first lens group output beam and produce a transformed output beam having an intensity distribution and is corrected for the wave aberration, the output beam having an intensity distribution according to $$I_{out}(\rho) = \begin{cases} I_{out0} & \text{for } \rho \leq r_{out} \\ 0 & \text{for } \rho > r_{out} \end{cases}$$

wherein ρ designates a variable beam radius, $I_{out}(\rho)$ designates output intensity distribution function, $r_{out}$ designates a radius of the output beam $I_{out0}$ is a constant.

* * * * *